March 3, 1964 P. OPPENHEIMER ET AL 3,123,230
MANIPULATORS
Filed March 20, 1961
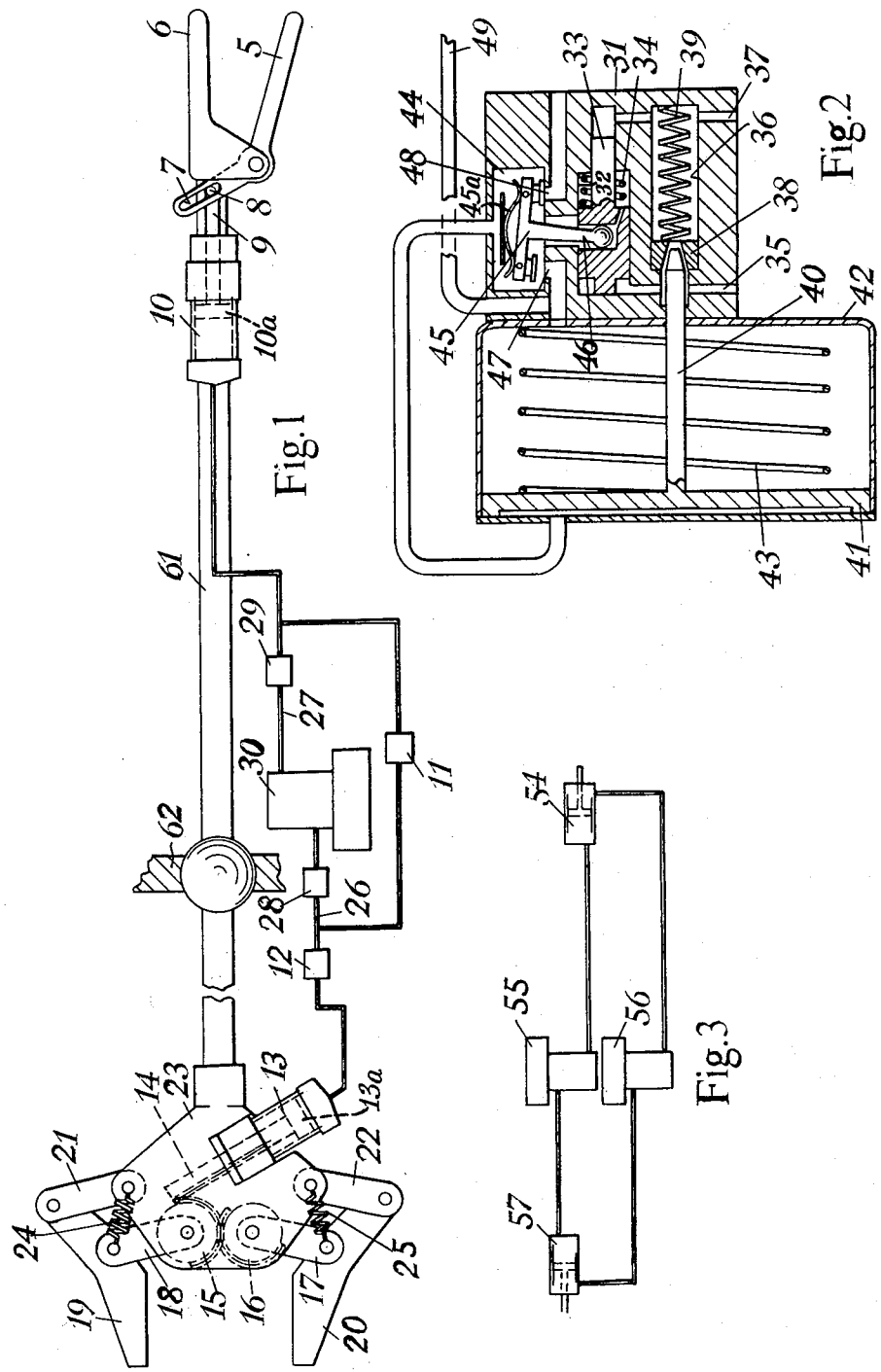

United States Patent Office 3,123,230
Patented Mar. 3, 1964

3,123,230
MANIPULATORS
Paul Oppenheimer, Edgbaston, Birmingham, and Michael Martin, Sparkbrook, Birmingham, England, assignors to Joseph Lucas (Industries) Limited, Birmingham, England
Filed Mar. 20, 1961, Ser. No. 97,041
1 Claim. (Cl. 214—1)

This invention relates to manipulators of the kind whereby articles or substances can be gripped at a position remote from the operator, and has for its object to provide a manipulator whereby the forces applied by the operator can be magnified, whilst still giving to the operator a "feel" in order that he may have sensitive and precise control.

A manipulator according to the invention comprises a pair of manually operable and relatively movable arms, means for translating relative movement of the arms into movement of a piston within a master cylinder, a pair of relatively movable grippers, a slave cylinder containing a piston, means for translating movement of the piston in the slave cylinder into relative movement of the grippers, a hydraulic circuit interconnecting the master and slave cylinders, and servo-mechanism connected in the hydraulic circuit, whereby pressure applied to the piston in the master cylinder will result in a magnified pressure being applied to the piston in the slave cylinder.

In the accompanying drawings, FIGURE 1 is a partly diagrammatic plan of one example of the invention, FIGURE 2 is a sectional diagrammatic view to an enlarged scale of the servo-mechanism shown in FIGURE 1, and FIGURE 3 is a scrap view in diagrammatic form of a modified example of the invention.

Referring to the drawings, there is provided a manually operable arm 5 pivotally attached to an arm 6 for angular movement relative thereto. In one end of the arm 5 there is formed a slot 7 which engages a pin 8 on a rod 9 connected to the piston 10a of the master cylinder 10 so that angular movement of the arm 5 relative to the arm 6 will impart movement to the piston of the master cylinder.

The master cylinder is connected through a pair of stop cocks 11 and 12 in series to a slave cylinder 13 containing a piston 13a. Connected to this piston there is a toothed rack 14 which meshes with a toothed segment 15 which is itself in mesh with a toothed segment 16. Secured to the segments 15 and 16 respectively are a pair of arms 17 and 18 which at their ends remote from the segments are pivotally attached to a pair of gripper jaws 19 and 20 respectively. A pair of links 21 and 22 which are pivotally attached to a body member 23 in which the segments 15 and 16 are mounted are also pivotally attached to the jaws 19 and 20 respectively, and together with the arms 17 and 18 form a pair of parallel linkages whereby the operative faces of the jaws are kept in parallel relationship when the jaws are opened or closed. The gripper jaws 19 and 20 are spring loaded towards an open position by a pair of tension springs 24 and 25 which interconnect the pivot pins which connect the arms 17 and 18 to the gripper jaws 19 and 20 respectively with the pivot pins by which the links 21 and 22 are connected to the body member 23.

To opposite sides of the stop cock 11 are connected a pair of branch pipes 26 and 27 which incorporate further stop cocks 28 and 29 respectively. The branch pipe 27 is connected to the hydraulic inlet of a known-type of servo-mechanism 30, whilst the branch pipe 26 is connected to the hydraulic outlet of the same mechanism. Moreover, the ends of the slave and master cylinders which are interconnected, together with the circuit interconnecting them, are filled with hydraulic fluid.

Referring to FIGURE 2 the servo-mechanism 30 comprises a body part 31 in which is formed a stepped cylinder 32 containing a stepped piston 33 which is loaded towards the wider end of the cylinder by means of a spring 34. The wider end of the cylinder is in communication with an inlet 35 which is connected to the master cylinder 10 through the cock 29. The narrower end of the cylinder 32 is in communication with the adjacent end of a second cylinder 36 in the body part 31, this end of the cylinder 36 also having an outlet 37 which is connected to the slave cylinder 13 through cocks 12 and 28. The cylinder 36 contains a piston 38 which is loaded towards the opposite end of the cylinder by a spring 39, whilst in the piston 38 is formed a conical seating for a complementary conical end of a stem 40. The stem is carried by a piston 41 in a cylinder 42 secured to the body part 31, and is loaded in the same direction as the piston 38 by a spring 43.

The end of the cylinder 42 at the side of the piston 41 remote from the spring 43, is connected to a valve chamber 44 formed in the body part. Moreover, in the chamber 44 is a T-shaped valve member 45 having a stem engaging in a recess 46 in the piston 33, the member being urged by a bowed spring 45a into a position to close a pair of ports 47, 48 but being rockable by movement of the piston 33 so as to uncover either of the ports. The port 48 is connected to a source of compressed air, whilst the port 47 is connected to the end of the cylinder 42 containing the spring 43 and also to an exhaust passage 49.

When the piston 10a in the master cylinder 10 is in its normal unactuated state the various parts of the mechanism are in the positions shown in FIGURE 2. But, when the piston in the master cylinder is actuated and pressure generated therein, fluid is forced past the seating in the piston 38 into the cylinder 36 and thence into the outlet 37 to actuate the slave cylinder. The pressure at the inlet 35 is also applied to both ends of the stepped piston 33, but owing to the different areas of the two ends of the piston the pressure moves the piston 33 to the right (as viewed in FIGURE 2), thereby causing the valve member 45 to be angularly rocked so as to close the port 47 and open the port 48. Compressed air is thus admitted through the port 48 to the valve chamber 44 and flows into the end of the cylinder 42 at the side of the piston 41 remote from the spring 43 to cause the piston 41 to move to the right (as viewed in FIGURE 2). The result is that the conical end of the stem 40 first closes against the seating in the piston 38 which it then moves axially in the cylinder 36 to increase the pressure in that cylinder and in the slave cylinder 13. This increased pressure in the cylinder 36 is also applied to the smaller end of the piston 33 in opposition to the master cylinder pressure on the other end, and when sufficient it moves the piston axially to rock the number 45 in a direction to close the port 48. Both ports 47 and 48 remain closed and the system is in a position of equilibrium with the pressure applied to the slave cylinder 13 steady so long as there is no change in the pressure applied by the piston 10a in the master cylinder 10. If on the one hand the pressure applied by the piston 10a in the master cylinder is increased, then the pressure applied to the larger end of the piston 33 is also increased and the member 45 is rocked to open the port 48 and reconnect the end of the cylinder 42 to the supply of compressed air. If on the other hand the pressure applied by the piston 10a in the master cylinder is reduced the piston 33 is returned by the pressure in the hydraulic system and the member 45 is rocked to open the port 47 and connect the end of the cylinder 42 to atmosphere.

For normal operation the stop cock 11 is closed, and the stop cocks 12, 28 and 29 are open. As a result relative angular movement of the arms 5 and 6 will apply a hydraulic pressure to the inlet 35 of the servo-mechanism 30, and this pressure will be magnified as applied to the piston in the slave cylinder 13.

If it is required to hold a predetermined pressure in the slave cylinder 13 the stop cock 12 is closed. Alternatively if no magnification of fluid pressure is required the stop cocks 11 and 12 can be opened and the stop cocks 28 and 29 closed.

In the modification of the invention shown in FIGURE 3 opposite ends of the master cylinder 54 are connected respectively to the hydraulic inlets of a pair of servo-mechanisms 55, 56 similar to the mechanism 30, the outlets of these mechanisms being connected to the opposite ends of the slave cylinder 57. By this modification magnified force can be applied to the gripper jaws in both directions, and the springs 24, 25 can be omitted. If desired stop cocks may be included in the hydraulic circuits to serve the same purpose as the stop cocks shown in FIGURE 1.

In another modification of the example shown in FIGURE 1 the ends of the slave cylinder remote from that connected to the servo-mechanism 30 may be connected to the source of compressed air through a solenoid actuated valve arranged to be opened under the control of a switch associated with the actuating arms. By this modification also the springs 24, 25 can be omitted.

If desired, in order to obtain an indication of the force of the grip the slave cylinder 13 may have connected thereto a pressure-sensitive transducer such, for example, as a piezo-electric crystal which is connected in a suitable electric indicating circuit.

In the illustrated example of the invention the arms 5 and 6 forming a master hand are connected to the body member 23 by means of a rod 61 having universal movement relative to a support 62 to allow the grippers to be manually twisted, moved from side to side, and raised or lowered. It will be appreciated, however, that twisting, or side to side, or vertical movements could be hydraulically transmitted from a master hand to the grippers by converting these movements into linear movement of a piston in a master cylinder and then reconverting the movement of the piston in an associated slave cylinder into the appropriate movement of the grippers. Conveniently, one of the modified hydraulic circuits referred to herein would be used when the movements mentioned above are hydraulically transmitted from the manually operable master hand to the gripper jaws.

Having thus described our invention what we claim as new and desire to secure by Letters Patent is:

A manipulator of the kind specified, comprising in combination a master cylinder, a first piston slidably accommodated within said master cylinder, a pair of arms which are pivotally interconnected on an axis in fixed relationship to said master cylinder, and one of which is manually movable relative to the other, means operatively interconnecting said first piston and the manually movable arm so that pivotal movement of the latter is accompanied by movement of said first piston, a slave cylinder spaced from said master cylinder, a second piston slidably accommodated within said slave cylinder, a pair of relatively movable grippers, means operatively connecting said grippers to said second piston so that movement of the latter is accompanied by relative movement of said grippers, hydraulic circuit means interconnecting said master cylinder and said slave cylinder so that movement of said first piston by said manually movable arm causes movement to be imparted hydraulically to said second piston, and servo-mechanism which is connected to, and controllable by the hydraulic pressure in, said hydraulic circuit means, and through the medium of which the hydraulic pressure exerted on said second piston by movement of said first piston is amplifiable relative to the pressure exerted on said first piston by said manually movable arm.

References Cited in the file of this patent
UNITED STATES PATENTS

| | | |
|---|---|---|
| 2,670,604 | Edge | Mar. 2, 1954 |
| 2,822,094 | Greer | Feb. 4, 1958 |
| 2,976,686 | Stelzer | Mar. 28, 1961 |